Feb. 7, 1939.　　　P. FARKAS　　　2,146,207
BRAKE ADJUSTING DEVICE
Original Filed Aug. 28, 1936
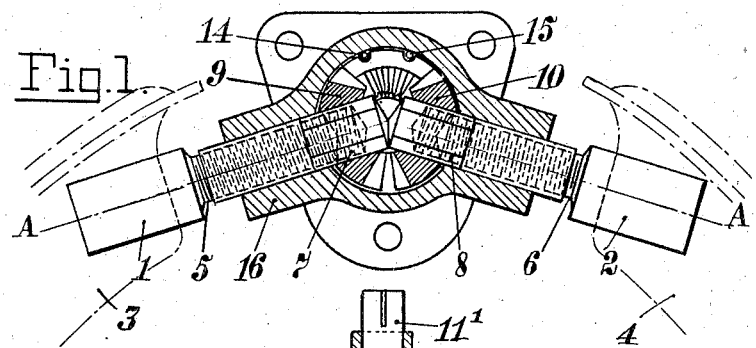
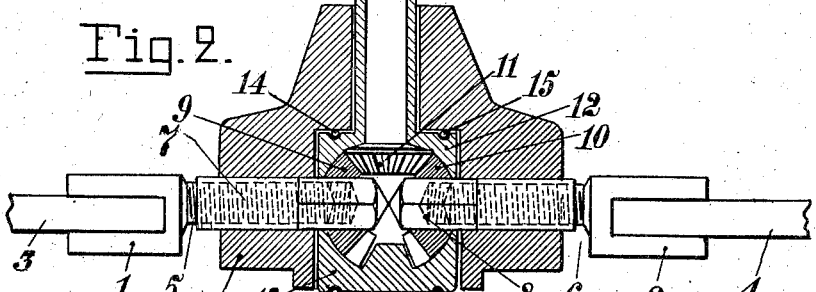
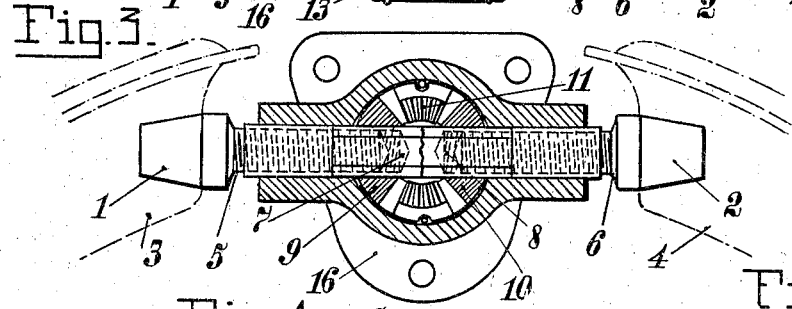
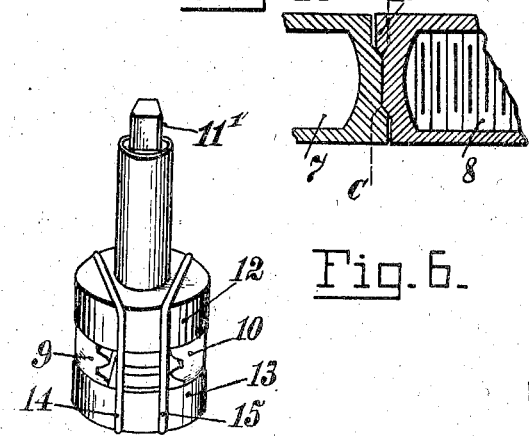
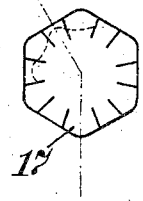
Inventor
PIERRE FARKAS
By
Young, Emery & Thompson
Attorneys Patented Feb. 7, 1939

2,146,207

UNITED STATES PATENT OFFICE 2,146,207

BRAKE ADJUSTING DEVICE

Pierre Farkas, Paris, France

Original application August 28, 1936, Serial No. 98,414. Divided and this application March 26, 1937, Serial No. 133,255. In France September 6, 1935

2 Claims. (Cl. 188—79.5)

The present invention has for its subject improvements in brake drum devices for automobile vehicles forming the subject of application Serial No. 98,414 filed August 28, 1936.

The present invention in particular relates to a device positioned diametrically opposite the actuating cam of a brake and comprises a casing rigid with the back plate supporting the shoes, a pair of members slidably mounted in said casing and provided with clevises engaging the ends of a pair of adjacent brake shoes to enable the one of the two shoes, which is subjected to the action of the actuating cam, to push the other shoe until the assembly formed by the two shoes is stopped by the stationary anchor member against which the end of the second shoe abuts. This device is also provided with means by which it is possible to adjust the spacing between the two ends of the shoes, which abut on the sliding members.

The present invention has for its object a device enabling such an adjustment to be made. This device is shown by way of example in the accompanying drawing, wherein:

Figure 1 is a cross-sectional view of the device.

Figure 2 is a sectional view on the line A—A—A of Figure 1.

Figure 3 shows a section of a modification of the form of construction shown in Figure 1.

Figure 4 is a detail view relating to the form of construction shown in Figure 3.

Figure 5 is a sectional view taken on line C—C of Figure 4.

Figure 6 is a perspective view of one of the members of the device.

According to the invention the members 1 and 2, which respectively receive the shoes 3 and 4, are secured to the end of screw threaded rods 5 and 6 which engage with stub shafts 7 and 8. These stub shafts are screw threaded internally and, at their ends remote from the members 1 and 2, have their outer surfaces shaped in such a manner as to be of polygonal cross-section, for example hexagonal. Crown gears 9 and 10, provided with angular teeth and spherical guiding surfaces and with an axial bore of the same cross-sectional shape as the stub shafts 7 and 8, are respectively fitted on each of these stub shafts and mesh with a pinion 11 keyed to the end of a short shaft 11'. The assembly formed by the two crown gears 9 and 10 and the operating pinion 11 is located in a mounting which, as shown in detail in Figure 6, is preferably formed of two parts 12 and 13 of which the internal portion is hollow in such a manner as to form suitable seatings for the pinion and crown gears and which are rigidly connected together preferably by resilient straps 14 and 15. The assembly is mounted in a casing 16 which is secured at a suitable point to the brake drum.

For adjusting the distance between the two shoes it suffices to turn the shaft 11', of which the end, projecting to the outside of the casing 16, is shaped so as to be engageable by a spanner. The pinion 11 drives the two crown gears 9 and 10 and these determine the rotation of the stub shafts 7 and 8. As the members 1 and 2 are prevented from turning by reason of the fact that they engage with the shoes 3 and 4, the rotation of the crown gears 9 and 10 causes the stub shafts 7 and 8, which can slide freely axially of the said crown gears, to project more or less from the members 1 and 2 by screwing more or less into or out of these and thus modifying the space between the two shoes, the two outer stub shafts 7 and 8 always bearing one against the other at A (Figure 1) or at C (Figures 3, 4 and 5).

In the form of construction shown in Figures 1 and 2, the two stub shafts 7 and 8 are arranged at a suitable angle relatively to one another. For the purpose of application to certain types of existing brake drums, these two stub shafts may also be arranged in alignment as shown in the modification forming the subject of Figures 3, 4 and 5. In this case the stub shafts which are in contact with one another, instead of being in the form of a shallow cone, as shown at A in Figure 1, are preferably planar as at C (Figure 3) but have opposing teeth 17 (Figures 4 and 5) which engage in each other and form a locking clutch once the adjustment has been effected.

I claim:

1. In a drum brake for vehicle wheels, having two circumferentially abutting shoes, one of which is adapted to transmit a circumferential thrust applied thereon to the other shoe, a device for adjusting the spacing between the abutting ends of said shoes comprising a pair of abutting axially slidable members, each member embodying a first part adapted to abut the corresponding part of the adjacent member and a second part secured to and movable with the abutting end of one of said shoes, said first and second parts being in threaded engagement with each other whereby the composite length of the member may be varied, a crown gear mounted on the first part of each member for axial sliding movement relatively thereto but rotatable therewith, a pinion meshing with the crown gears on both of said members, a casing surrounding said crown gears and pinion, and a shaft carrying said pinion and extending to the exterior of said casing to rotate said crown gears and said first parts of said members to vary the spacing between the ends of said shoes.

2. In a drum brake for vehicle wheels, having two circumferentially abutting shoes, one of which is adapted to transmit a circumferential thrust applied thereon to the other shoe, a device for adjusting the spacing between the abutting ends of said shoes comprising a pair of abutting axially slidable members, each member embodying a first part adapted to abut the corresponding part of the adjacent member and a second part secured to and movable with the abutting end of one of said shoes, said first and second parts being in threaded engagement with each other whereby the composite length of the member may be varied, a crown gear mounted on the first part of each member for axial sliding movement relatively thereto but rotatable therewith, a pinion meshing with the crown gears on both of said members, a two-part casing surrounding said crown gears and pinion, said casing having an interior contour for maintaining said gears in meshing operative relation with said pinion, means for elastically maintaining the two parts of said casing in assembled relation, and a shaft carrying said pinion and extending to the exterior of said casing to rotate said crown gears and said first parts of said members to vary the spacing between the ends of said shoes.

PIERRE FARKAS.